(12) United States Patent
Li et al.

(10) Patent No.: US 6,325,909 B1
(45) Date of Patent: Dec. 4, 2001

(54) METHOD OF GROWTH OF BRANCHED CARBON NANOTUBES AND DEVICES PRODUCED FROM THE BRANCHED NANOTUBES

(75) Inventors: Jing Li, Ottawa; Christo Papadopoulos, Toronto, both of (CA); Jingming Xu, Providence, RI (US)

(73) Assignee: The Governing Council of The University of Toronto, Toronto (CA)

( * ) Notice: Subject to any disclaimer, the term of this patent is extended or adjusted under 35 U.S.C. 154(b) by 0 days.

(21) Appl. No.: 09/453,810

(22) Filed: Dec. 3, 1999

Related U.S. Application Data

(60) Provisional application No. 60/155,636, filed on Sep. 24, 1999.

(51) Int. Cl.[7] ............................. C25D 5/18; C25D 11/22; C25D 5/48; C25D 11/04
(52) U.S. Cl. ......................... 205/106; 205/105; 205/173; 205/221; 205/223; 205/324
(58) Field of Search ..................................... 205/106, 118, 205/173, 201, 202, 221, 223, 324, 105

(56) References Cited

U.S. PATENT DOCUMENTS

| | | | |
|---|---|---|---|
| 4,687,551 | * 8/1987 | Furneaux et al. | 204/11 |
| 5,413,866 | 5/1995 | Baker et al. | 423/447.2 |
| 5,457,343 | 10/1995 | Ajayan et al. | 257/734 |
| 5,489,477 | 2/1996 | Ohta et al. | 428/408 |
| 5,747,161 | 5/1998 | Iijima | 428/367 |
| 5,753,088 | 5/1998 | Olk | 204/173 |
| 5,830,326 | 11/1998 | Iijima | 204/173 |

OTHER PUBLICATIONS

Carbon Nanotube "T Junctions": Nanoscale Metal–Semi-conductor–Metal Contact Devices, vol. 79, No. 22, Dec. 1, 1997 Physical Review Letters, pp. 4453–4456.

Pure Carbon Nanoscale Devices: Nanotube Heterojunctions, vol. 76, No. 5, Feb. 5, 1996, Physical Review Letters, pp. 971–974.

Tunneling Conductance of Connected Carbon Nanotubes, vol. 53, No. 4., Jan. 15, 1996, Physical Review B, pp. 2044–2250.

Structural and Electronic Properties of Pentagon–heptagon Pair Defects In Carbon Nanotubes, vol. 53, No. 16, Apr. 15, 1996, Physical Review B, pp. 11 108–11 113.

Nanotube Nanodevice, vol. 278, Oct. 3, 1997, www.sciencemag.org, Science, pp. 100–103.

Nanoscale electronic devices on carbon nanotubes, Nanotechnology 9 (1998) pp. 153–157 1998 IOP Publishing Ltd.–No month available.

* cited by examiner

*Primary Examiner*—Edna Wong
(74) *Attorney, Agent, or Firm*—Lynn C. Schumacher; Hill & Schumacher

(57) ABSTRACT

A method of producing Y-junction carbon nanotubes. An alumina template with branched growth channels is produced after which individual Y-junction carbon nanotubes are grown directly by pyrolysis of acetylene using cobalt catalysis. The use of a branched growth channel allows the natural simultaneous formation of a very large number of individual but well-aligned three-port Y-junction carbon nanotubes with excellent uniformity and control over the length (up to several tens $\mu$m) and diameter (15–100 nm) of the "stem" and "branches" separately. These Y-junctions offer the nanoelectronics community a new base material for molecular scale electronic devices including for example transistors and rectifiers.

31 Claims, 8 Drawing Sheets

METHOD OF GROWTH OF BRANCHED CARBON NANOTUBES AND DEVICES PRODUCED FROM THE BRANCHED NANOTUBES

CROSS REFERENCE TO RELATED US PATENT APPLICATION

This patent application claims the benefit of to U.S. Provisional patent application, Ser. No. 60/155,636, filed on Sep. 24, 1999, entitled METHOD OF GROWTH OF BRANCHED CARBON NANOTUBES AND DEVICES PRODUCED FROM THE BRANCHED NANOTUBES.

FIELD OF THE INVENTION

The present invention relates to a method of producing branched carbon nanotubes.

BACKGROUND OF THE INVENTION

Carbon nanotubes have emerged as promising candidates for nanoelectronic devices because of their unique electronic properties as disclosed in for example Dresselhaus, M. S., Dresselhaus, G. and Eklund, P. C. *Science of Fullerenes and Carbon Nanotubes* (Academic, San Diego, 1996). They exhibit either metallic or semiconducting behavior depending on the diameter and helicity of the tubes, as disclosed in Wildoer, J. W. G.; Venema, L. C.; Rinzler, A. G.; Smally, R. E.; and Dekker, C.; *Nature* 391, 59–61, 1998 and Odom, T. W.; Huang J.; Kim, P.; and Lieber, C. M.; *Nature* 391, 61–64, 1998., and can conduct current ballistically with little heat dissipation, see Frank, S.; Poncharal, P.; Wang, Z. L.; and de Heer, W. A.; *Science* 280, 1744–1746, 1998.

These properties have recently generated great interest in forming nanotube two-way or three-way heterojunctions between different tubes for use as building blocks in nanoelectronic devices as disclosed in Chico, L.; Crespi, V. H.; Benedict, L. X.; Louie, S. G.; and Cohen, M. L.; *Phys. Rev. Lett.* 76, 971–974, 1996; Mennon, M.; Srivastava, D.; *Phys. Rev. Lett.* 79, 4453–4456, 1997; and Mennon, M.; Srivastava, D.; *J. Mater. Res.*, 13, 2357–2362, 1998. However, this will be difficult to achieve using conventional carbon nanotube growth methods, such as disclosed in Ebbsen, T. W., *Carbon Nanotubes: Preparation and Properties* (CRC Press, Boca Raton, Fla., 1997), since the straight tube structure cannot be controllably altered along its length. Ideas for post-growth modifications have been advanced in the literature, but are hard to implement in practice and prone to defects, see Collins, P. G., Bando, H. G., Zettl, A.; *Nanotechnology* 9, 153–157, 1998.

The ability to create devices on the scale of nanometers is a goal sought by many. One class of nanostructures which hold great promise for molecular scale devices are carbon nanotubes. In order to form electronic devices based on these structures, mainly theoretical proposals have been advanced on ways to obtain heterojunctions between different nanotubes. However, this is difficult to achieve with conventional nanotube fabrication methods, all of which produce simple straight tubes.

While there have been proposals to fabricate nanotube heterojunctions using other methods, all involve mechanically assembling or manipulating straight nanotubes after they are grown, see Collins, P. G., Bando, H. and Zettl, A. *Nanotechnology* 9, 153–157, 1998.

U.S. Pat. No. 5,753,088 issued to Olk is directed to a method for making carbon nanotubes. The method involves submerging carbon anode and cathode electrodes into liquid nitrogen, helium or hydrogen and passing a direct current between the electrodes thereby growing the nanotubes on the surface of the cathode.

U.S. Pat. No. 5,424,054 issued to Bethune et al. discloses a method of producing carbon fibers or tubes having a wall thickness equal to a single layer of carbon atoms. The method uses arc discharge between a carbon rod cathode and a hollowed out anode containing cobalt catalyst/carbon powder. Discharge takes place in an inert atmosphere.

U.S. Pat. No. 5,830,326 issued to Lijima teaches a method of producing carbon nanotubes using direct current discharge between carbon electrodes in a rare gas atmosphere, preferably argon.

U.S. Pat. No. 5,747,161 issued to Lijima is very similar in terms of the disclosure to Lijima ('326) discussed immediately above but the claims are directed to the product of the growth process.

U.S. Pat. No. 5,413,866 issued to Baker et al. is directed to carbon filaments produced using a thermal gas phase growth process in which a carbon containing gas is decomposed in the presence of a catalyst coated substrate. The type of metal catalyst employed has an effect on the structure of the carbon filament produced.

U.S. Pat. No. 5,457,343 issued to Ajayan et al. discloses carbon nanotubes containing foreign materials, in other words a carbon nanotube used as a storage device. The nanotubes are produced in an inert atmosphere in an electric discharge.

U.S. Pat. No. 5,489,477 issued to Ohta et al. is directed to a method of producing high-molecular weight carbon materials incorporating $C_{60}$ fullerene structures.

It would be very advantageous to provide a method for producing Y-junction carbon nanotubes which can be used to construct nanoscale electronic components.

SUMMARY OF THE INVENTION

It is an object of the present invention to provide a method of growing branched carbon nanotubes.

An advantage of the present invention is that it allows for the production of a very large number of individual but well-aligned three-port Y-junction carbon nanotubes with excellent uniformity and control over the dimensions of the tube.

In one aspect of the invention the present invention provides a method of producing branched carbon nanotubes, comprising:

producing a template by anodizing a sheet of aluminum in an acid solution at a first anodization voltage $V_1$ for a first effective period of time to produce an array of pores at a surface of the aluminum, said first anodization voltage producing said pores with a first diameter;

reducing said first anodization voltage by a preselected amount to a second anodization voltage $V_2$ and anodizing for a second effective period of time so that at least some of said pores branch into at least two pores each having a second diameter less than said first diameter; and exposing said anodized aluminum template to an effective hydrocarbon gas at an effective temperature, pressure and flow rate to grow carbon nanotubes in said branched pores.

In another aspect of the invention there is provided a method of producing an alumina template having branched pores, comprising:

producing a template by anodizing a sheet of aluminum in an acid solution at a first anodization voltage $V_1$ for a first effective period of time to produce a hexagonal array of pores at a surface of the sheet of aluminum, said first anodization voltage producing pores with a first diameter;

etching an anodic film produced by anodizing the sheet of aluminum at said first anodization voltage and after the anodic film has been removed anodizing said sheet of aluminum at $V_1$ for a second effective period of time; and reducing said first anodization voltage by a preselected amount to a second anodization voltage $V_2$ and anodizing for a third effective period of time so that at least some of said pores branch into two pores each having a second diameter less than said first diameter;

depositing an effective catalyst into said pores of said template; and exposing said anodized aluminum template with the catalyst containing pores to an effective hydrocarbon gas at an effective temperature, pressure and gas flow rate to grow carbon nanotubes in said branched pores.

In another aspect of the invention there is provided a method of producing an alumina template having branched pores, comprising:

producing a template by anodizing a sheet of aluminum in an acid solution at a first anodization voltage $V_1$ for a first effective period of time to produce a hexagonal array of pores at a surface of the aluminum, said first anodization voltage producing said pores with a first diameter;

etching an anodic film produced by anodizing the sheet of aluminum in at said first anodization voltage and after the anodic film has been removed anodizing said sheet of aluminum at $V_1$ for a second effective period of time;

reducing said first anodization voltage by a preselected amount to a second anodization voltage $V_2$ and anodizing for a third effective period of time so that at least some of said pores branch into two pores each having a second diameter less than said first diameter.

The present invention further provides a branched carbon nanotube, comprising a tubular stem having a first diameter and two tubular branches integrally formed at one end of the tubular stem, the two tubular branches each have a diameter smaller than the first diameter.

The present invention provides a carbon nanotube rectifier, comprising a Y-shaped branched carbon nanotube including a tubular stem having a first diameter and two tubular branches integrally formed at one end of the tubular stem. The two tubular branches each have a diameter smaller than the first diameter. The tubular stem is electrically connected to a first electrical conductor and one or both of the two tubular branches are electrically connected to a second electrical conductor.

The present invention also provides a carbon nanotube transistor, comprising a Y-shaped branched carbon nanotube including a tubular stem having a first diameter and two tubular branches integrally formed at one end of said tubular stem. The two tubular branches each have a diameter smaller than the first diameter. The tubular stem is electrically connected to a first electrical conductor and one of the two tubular branches is electrically connected to a second electrical conductor. The other tubular branch being electrically connected to a third electrical conductor. There is included means for applying a voltage to each of the tubular stem and the two tubular branches.

BRIEF DESCRIPTION OF THE DRAWINGS

The following is a description, by way of example only, of a method of growing branched carbon nanotubes and producing devices therefrom in accordance with the present invention, which will be illustrated with reference to the drawings, in which.

DETAILED DESCRIPTION OF THE INVENTION

The present invention provides a method of producing alumina templates with branched channels for growing individual Y-junction carbon nanotubes. The nanotubes are grown by pyrolysis of a hydrocarbon preferably in the presence of a catalyst deposited into the branched channels. This deposition of carbon by this process of pyrolysis is commonly referred to as Chemical Vapor Deposition (CVD). The use of a branched growth channel allows the natural simultaneous formation of a very large number of individual but well-aligned three-port Y-junction carbon nanotubes with excellent uniformity and control over the length (up to several tens $\mu$m) and diameter (approximately 15–100 nm) of the "stem" and "branches" separately. These Y-junction carbon nanotubes offer the nanoelectronics community a new base material for molecular scale electronic devices such as transistors and rectifiers.

The method of growth of the branched nanotubes involves forming an alumina template using a three step process wherein a thin sheet of aluminum is anodized in an acid solution under constant voltage in order to form a hexagonal array of pores near the surface of the aluminum. The initial anodic film is subsequently etched and a second anodization process is performed similar to the first step. The final step for creating the branch channels is performed by reducing the voltage by approximately one half to thereby reduce the size of the formation of the pores. Following the process of producing the template with the branched pores, the subsequent step is to electrochemically deposit a catalyst in the template channels in order to form the branched nanotubes by decomposing a hydrocarbon in the pores.

In a preferred embodiment of the process the first anodization step followed by the etching step is carried out as described below for the purposes of forming a hexagonal array of pores which results in a hexagonal ordering of the "stems" of the carbon nanotubes eventually grown in the pores. However, branched carbon nanotubes can be produced using a template having branched pores that do not have hexagonal packing. The etching step is necessary to obtain the hexagonal ordering. In general it is possible to obtain the branched alumina template needed to grow the Y-nanotubes using just two steps: first anodization of the Al sheet, and reduction of voltage during this anodization procedure to give the branched pores.

Figure 1A:
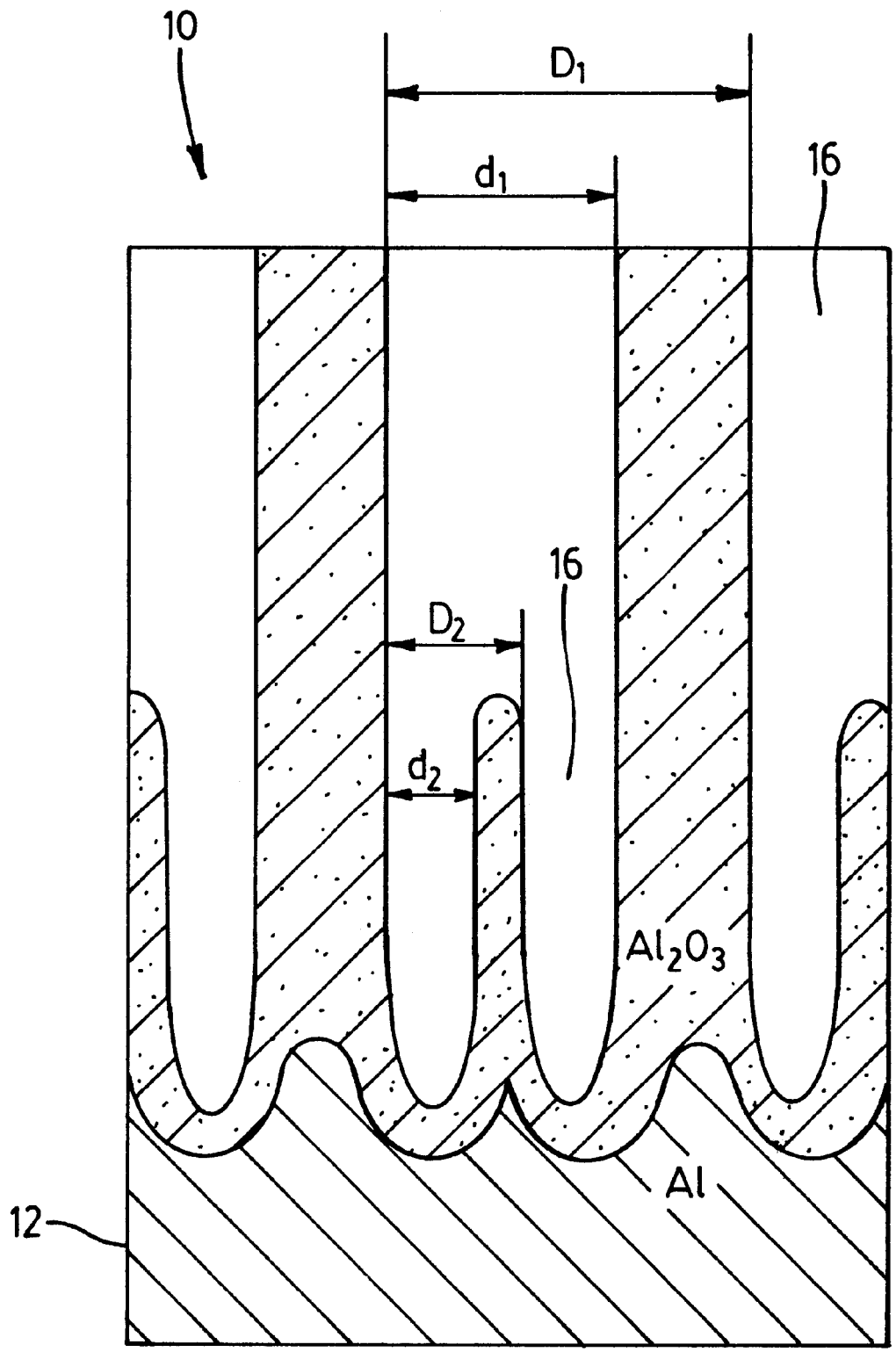
FIG. 1a is a schematic diagram of branched pore formation in a nanochannel alumina (NCA) template.
Figure 1B:
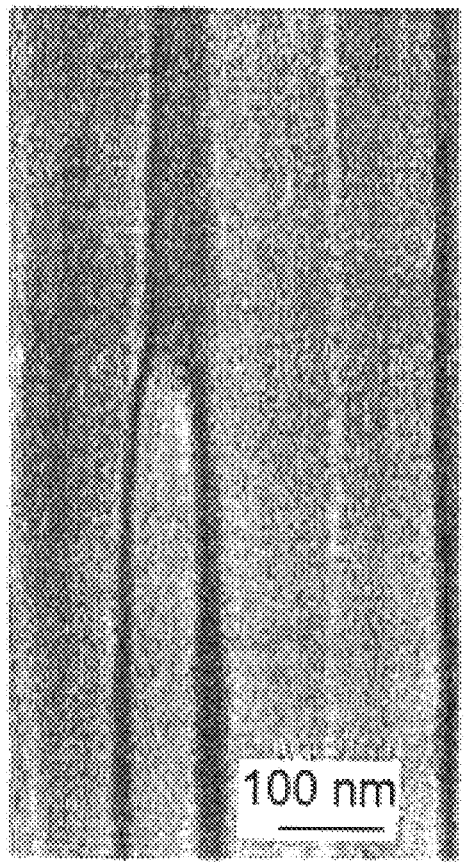
FIG. 1b is a scanning electron micrograph (SEM) cross-section image of a branched pore in NCA template.

More particularly, referring to FIG. 1, a novel branched nanochannel alumina (NCA) template, shown generally at 10, produced according to the present invention was used to grow the Y-junction carbon nanotubes. This template was formed using a three-step process: (i) A thin sheet of high purity (99.999%) electropolished aluminum sheet 12 was anodized preferably in a 0.3M oxalic acid solution at 10° C. under a constant voltage of 50V for 15 h. Other acids such as sulfuric or phosphoric or chromic acid may be used instead of oxalic acid. This results in a hexagonal array of pores near the aluminum surface.

This initial anodic film was then etched away using a mixture of phosphoric (6 wt %) and chromic (1.8 wt %) acids. (ii) A second anodization was then performed under identical conditions as the first, typically for 30 min. (iii) The essential final step for creating the branched channels 16 is reducing the anodization voltage to about 35V half-way through the anodization process.

The pore cell diameter is proportional to the anodization voltage and thus a reduction of voltage by a factor of $1/\sqrt{2}$ results in a pore cell with half the area of the original. The cell diameter D is approximate equal to 2.4 nm/V in the present experimental conditions, which is smaller than 2.8 nm/V reported by previous studies (see Randon J., Mardilovich, P. P., Govyadinov A. N. and Paterson R.; *J. of Colloid and Interface Science* 169, 335–341, 1995), and the pore diameter d approximate equal to 0.8 nm/V in 0.3M oxalic acid electrolyte at a temperature range of 10 to 15° C. The ratio of D/d is in the good agreement with the value of 3.01 previous reported. Therefore to maintain the original total area of the template twice as many pores must appear after reducing the voltage by a factor of $1/\sqrt{2}$ and it was found that almost all pores branched into two smaller diameter pores. This is shown in the scanning electron microscope (SEM) image in FIG. 1b of a cross-section of the branched NCA template where the anodization voltage was gradually reduced to 35V and anodization continued for another 40 min. The result is the formation of a template of parallel branched pores with 40 nm diameter stems and 28 nm diameter branches.

Preferably $V_1$ is in a range of from about 40 V to about 100 V when using the oxalic acid but if different acids are used and the templates are grown without hexagonal ordering of the pores, this range may be extended from about 5V to about 300V.

The above exemplary example is a preferred embodiment of the process in which the first anodization step followed by the etching step is carried out as described for the purposes of forming a hexagonal array of pores which results in a hexagonal ordering of the "stems" of the carbon nanotubes eventually grown in the pores. However, branched carbon nanotubes can be produced using a template having branched pores that do not have hexagonal packing. The etching step is necessary to obtain the hexagonal ordering. In general it is possible to obtain the branched alumina template needed to grow the Y-nanotubes using just two steps: first anodization of the Al sheet, and reduction of voltage during this anodization procedure to give the branched pores.

Figure 1C:
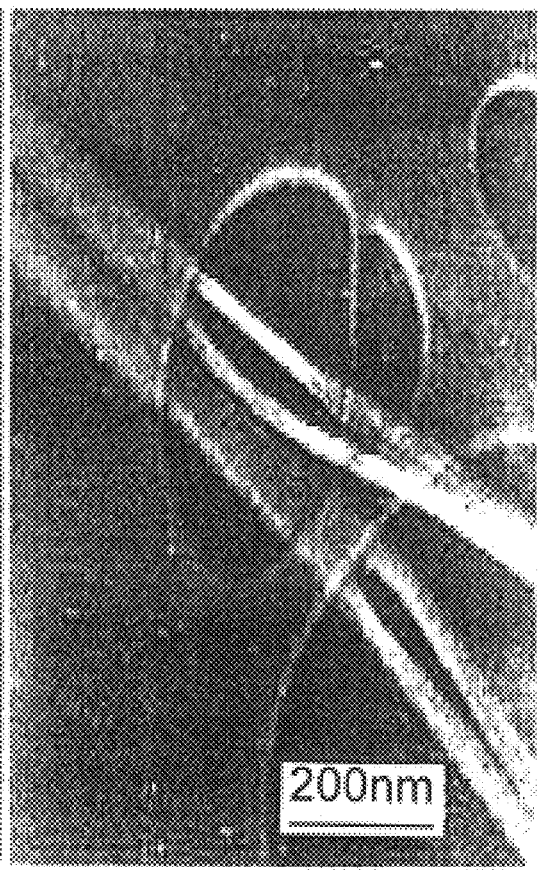
FIG. 1c is a transmission electron micrograph (TEM) image of the Y-junction carbon nanotubes formed in the branched pores.

The next step is to electrochemically deposit a small amount of catalyst (preferably cobalt) in the bottom of the template channels followed by reducing the catalyst at 600° C. for 4–5 h under a CO flow (100 cm$^3$ min$^{-1}$) in a tube furnace. The Y-junction nanotubes are then grown in the branched nanochannel template by pyrolysis of acetylene at 650° C. In a non-limiting example of the present process, a mixture of 10% acetylene in nitrogen flows at a rate of 100 cm$^3$ min$^{-1}$ for 2 h at 650° C. Finally, the samples are annealed in nitrogen for 15 h at the same temperature. An example of the resulting Y-junctions which were formed is shown in FIG 1c. The annealing may be done either with the carbon nanotubes still encased in the template or once the template has been dissolved away.

In addition to acetylene, many other hydrocarbon gases may be used, including but not limited to carbon monoxide, ethylene, methane, benzene, propylene and pyrene.

It will also be understood that while the best mode for producing the branched carbon nanotubes involves pyrolysis of the hydrocarbon gas in the presence of a catalyst, if high enough temperatures are used during pyrolysis then the nanotubes may be grown in the absence of a catalyst in either the hexagonally ordered template or the templates with no hexagonal ordering. Cobalt is a preferred catalyst but other catalysts that work to some degree include for example nickel, cobalt/nickel alloys, iron, cobalt/iron alloys, copper, iron/copper alloys, platinum, molybdenum, iron-molybdenum.

Figures 2A, 2B:
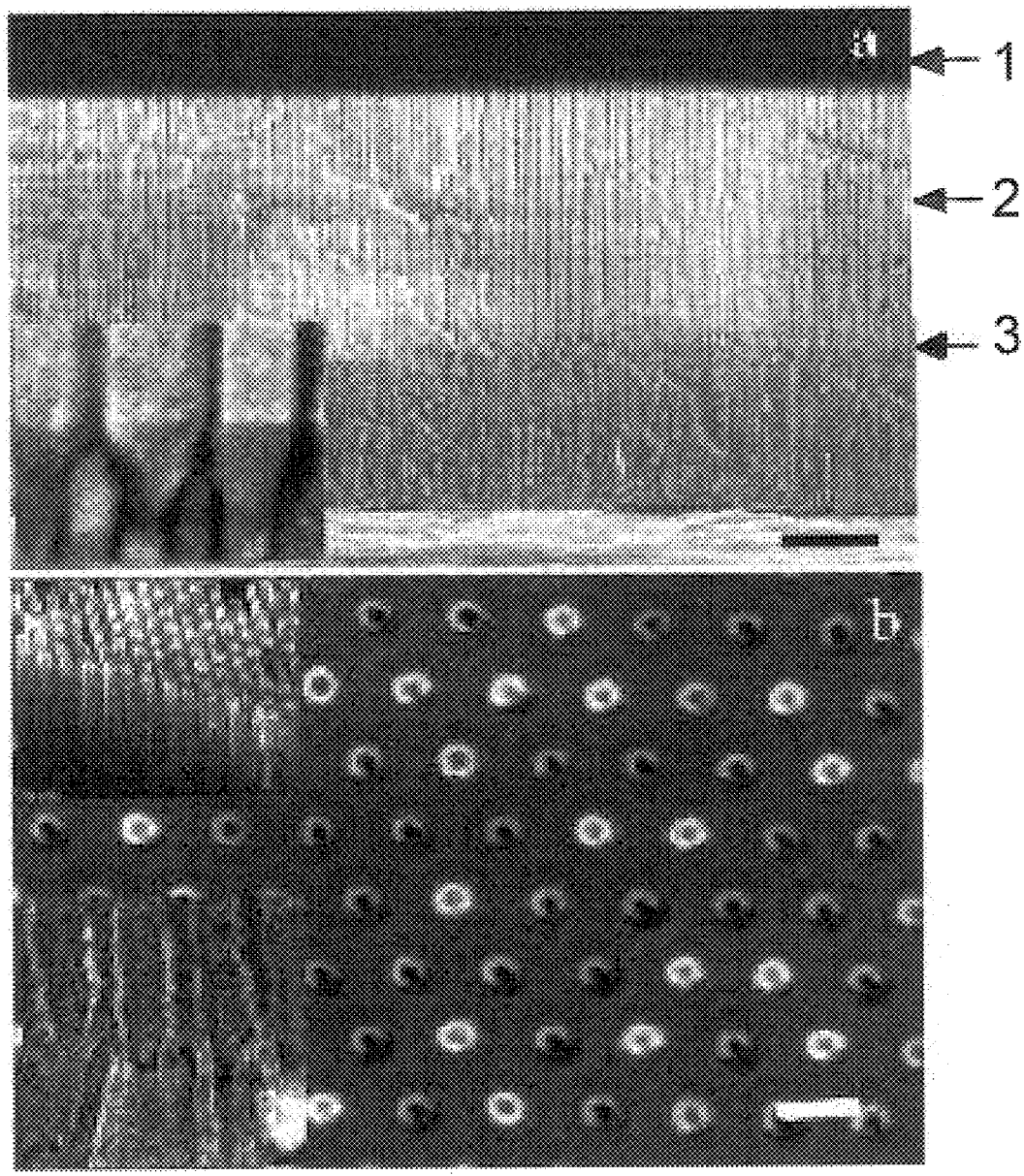
FIG. 2a is an SEM image of a branched template anodized at $V_1$=50 V and $V_2$=35 V. Arrow 1 points the surface of the template, 2 points the stem pores portion and 3 is the position where branched pores start to grow (see the inset for close-up)
FIG. 2b is a top view SEM image of the carbon nanotubes aligned in the template after ion-milling amorphous carbon to clean the surface. Inset shows the stem tubes which was slightly etched by phosphoric acid/chromic acid.
Figures 3A, 3B:
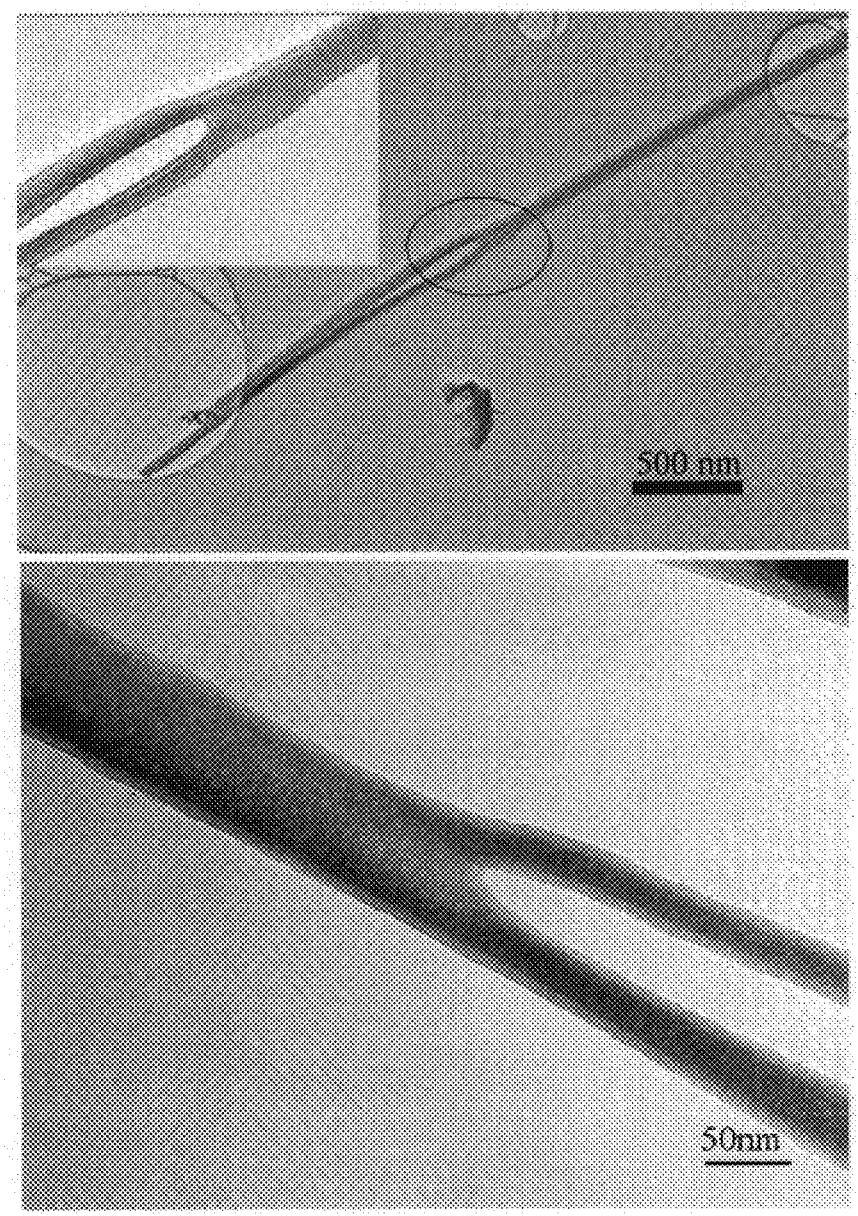
FIG. 3a is a TEM image of a typical Y-junction portion with a 60 nm diameter stem and two 35 nm branches.
FIG. 3b shows a Y-junction tube removed from the template it was produced in having approximate 90 nm diameter of stem tube and 50 nm branch ones, which was grown in the template anodized under 60 V of $V_1$ and 40 V of $V_2$. Inset is a close-up image of the circle portion.

The samples were characterized using scanning electron microscopy (SEM, HS-4500) and transmission electron microscopy (TEM, H7000). FIG. 2a is an SEM image of a branched template anodized at $V_1$=50 V and $V_2$=35 V. Arrow 1 points the surface of the template, 2 points the stem pores portion and 3 is the position where branched pores start to grow (see the lower inset in FIG. 2a for a close-up). The cross-section image in FIG. 2a shows that the template consists of 3 µm long stems and 2 µm long branches. All of the branching occurred at the same depth as indicated by the arrow, corresponding to the anodization voltage drop to 35V. FIG. 2b shows a top view SEM image of the carbon nanotubes aligned in the template after ion-milling amorphous carbon on the surface. Inset shows the stem tubes which was slightly etched by phosphoric acid/chromic acid. The SEM image in FIG. 2b shows the top-view of the branched NCA template after pyrolytic nanotube growth consisting of 60 nm diameter nanotubes arranged in a hexagonal lattice. The fact that the nanotube diameter is larger than the pore diameter is attributed to the thermal expansion of the template during the high temperature pyrolysis process. The top inset shows the length of the stems after partially exposing the template using a chemical etch. The bottom inset is a cross-section at the branching point showing that the larger carbon nanotube (stem) gradually evolved into two branches, forming a continuous Y-junctions with three clearly separated ports. These images show that a very large number (~$10^8$/cm$^2$) of well-aligned Y-junction carbon nanotubes are formed using this method. in addition, the Y-junctions are very uniform with regard to the position of the junction and the diameters of the individual arms. Further characterization of the Y-junction nanotubes was carried out using TEM. The Y-junctions in FIGS. 3a and 3b were completely removed from the NCA template using a chemical etch. It is seen from FIG. 3a that the Y-junctions consist of three well-defined terminals; a 60 nm diameter stem two 35 nm branches. By varying the anodization conditions we were able to produce Y-junction nanotubes with different diameter stems and branches; FIG. 3b shows a Y-junction having an approximately 90 nm diameter stem and 50 nm branches. This heterojunction was grown in a template where the anodization voltage was reduced from 60V to 40V. Electron diffraction patterns of the Y-junction tubes show that both the stem and branched portions have a graphitic structure.

The unique and very surprising result that preferential growth of Y-junction carbon nanotubes can occur instead of the straight variety is intimately connected with the branched NCA template disclosed herein. Although the actual growth mechanism is unknown, and explanations, if any, must be speculative and will be understood to be non-limiting, it is believed that by confining the nanotube to grow within a Y-branched channel effectively places a constraint on the catalytic decomposition of the acetylene thereby forcing the tube structure to grow in the shape of the channel. The reasons for this are, first, using TEM it has been observed residual cobalt in the base of the tubes indicating that a base growth mechanism (Baker, R. T. K., Chludzinski, J. J., Jr., Lund, C. R. F. *Carbon* 21, 295–303, 1987.) is largely responsible for the tube growth and second, the NCA template also acts as a catalyst in the nanotube growth guiding the growth along the channel walls. However, it will be understood there is a range of template channel branching angles and diameters that can be used since the process of pore branching into a Y-junction in the template may not result in a shape that is energetically favorable for the two nanotubes in the branched pores to atomically merge into a Y-junction.

Several important features of the approach for fabricating Y-junction carbon nanotubes disclosed herein are noted. The controlled variation of the Y-junction arm lengths and diameters depend on easily adjustable parameters such as the anodizing voltage, electrolyte composition and temperature. Since the dimensions of the branched arms can be varied separately from the larger stem, Y-junctions of different dimensions and characteristics can be formed. Post-growth etching or polishing of the Y-junctions in the template can also be used to shorten the arm lengths. In addition, because the Y-junctions are formed as individually separated structures, aligned in the templates, electrical connection is facilitated. The Y-branched template method disclosed herein allows the direct growth of a large number of highly-uniform three terminal nanotube Y-junctions in parallel without the need for additional processing steps.

Figure 4A:
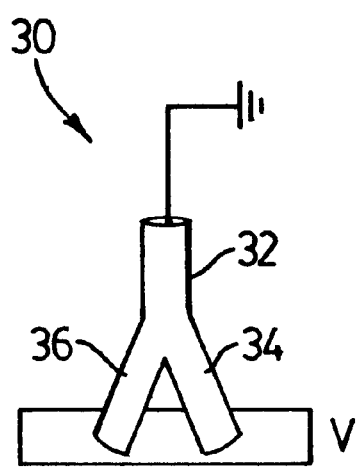
FIG. 4a is a schematic diagram of a device based on the present Y-junction carbon nanotube, more particularly a two-terminal nanoscale diode due to bandgap asymmetry as a result of a heterojunction produced by the joining together of different diameter carbon nanotubes.
Figure 4B:
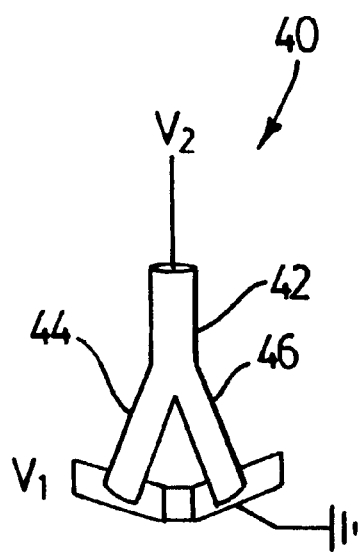
FIG. 4b shows a schematic diagram of a three-terminal double heterostructure transistor with narrow bandgap base, based on the present Y-junction carbon nanotube.
Figure 5A:
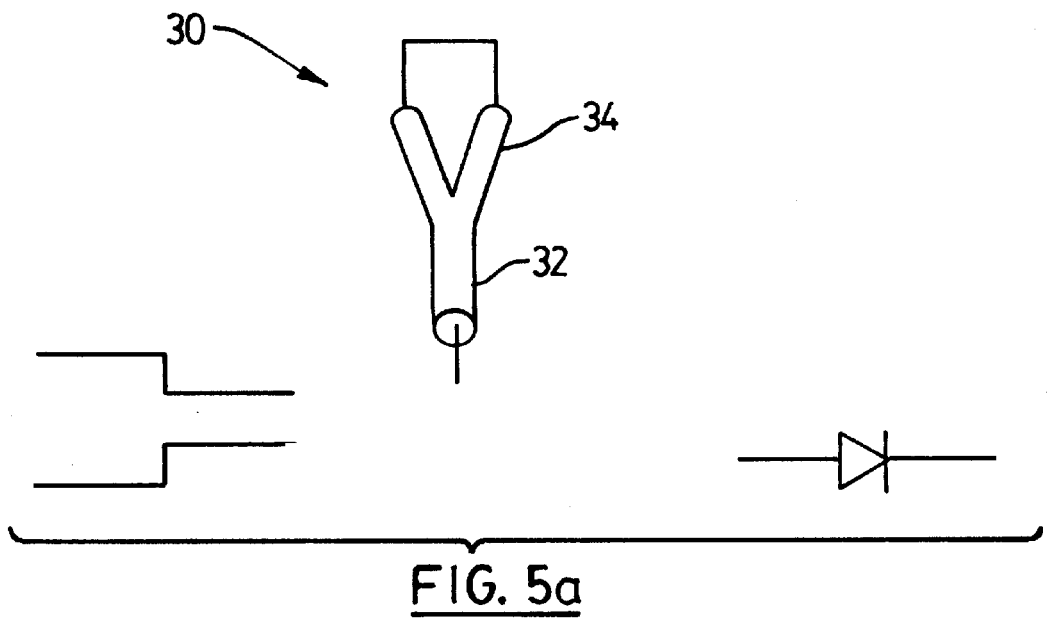
FIG. 5a is a diagram of the Y-junction carbon nanotube configured as a diode circuit element as in FIG. 4a showing the relationship between the parts of the diode and the branches and stem of the nanotube.
Figure 5B:
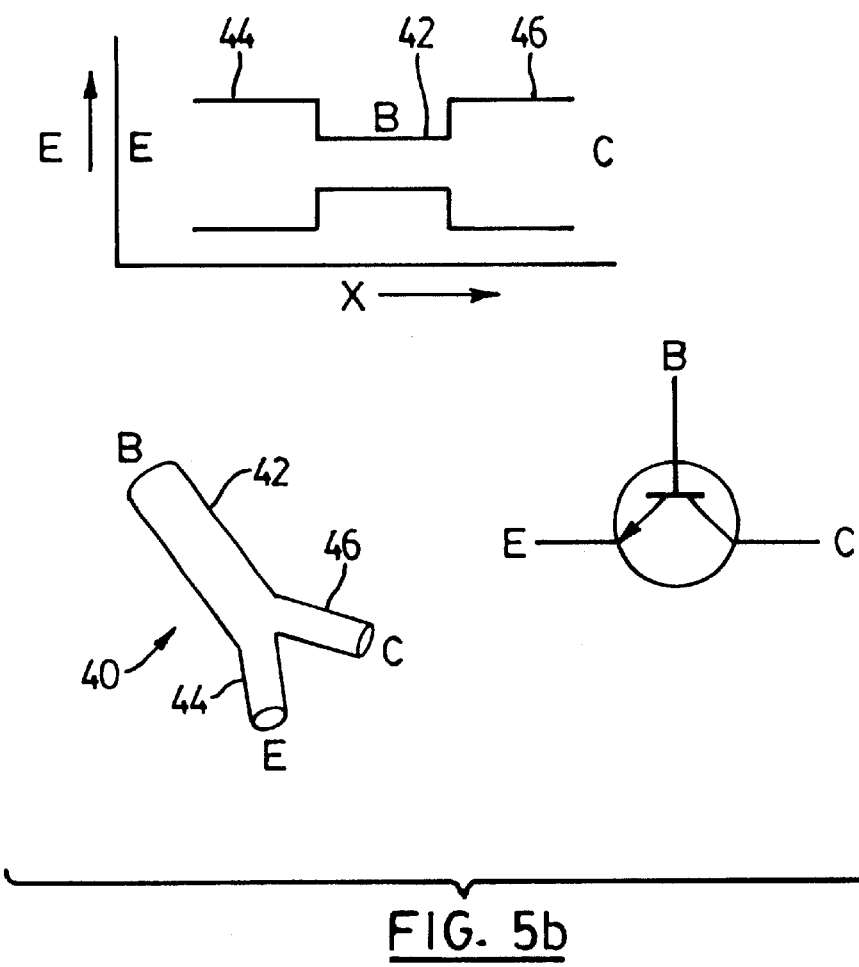
FIG. 5b is a diagram of the Y-junction carbon nanotube configured as a triode circuit element as in FIG. 4b showing the relationship between the parts of the triode and the branches and stem of the nanotube.

These Y-junction nanotubes are useful for a variety electronic device functionalities based on the known electronic properties of nanotubes and their dependence on the tube diameter. Two- and three-terminal device configurations based on the Y-junction carbon nanotubes are shown in the perspective views of FIGS. 4a and 4b and FIGS. 5a and 5b show the correspondence between the structure of the nanotubes and the diode and triode configurations respectively. The two-terminal implementation of FIGS. 4a and 5a is used for rectification while the three-terminal device of FIGS. 4b and 5b is used as a Y-junction transistor/switch, controlling the conductivity between the two smaller diameter branches by changing the potential of the larger stem tube.

FIGS. 4a shows the two-terminal diode-like device 30 is obtained by connecting the two smaller diameter branches 34 and 36 together, or just one of them, to one lead and the larger tube 32 to the second. Because the larger diameter tube 32 has a smaller band gap than the branches 34 and 36 an asymmetry is introduced which allows electrons to flow more easily from the smaller tubes 34, 36 to the larger one 32 when an external bias is applied, see FIG. 5a. FIGS. 4b and 5b show a three-terminal double-heterostructure bipolar transistor-like device 40 showing which parts of the nanotube correspond to the parts of the triode. The large diameter stem tube 42 acts as the narrow band gap base B and the two branches 44 and 46 are the wide band gap emitter and collector respectively. Such a nanotube transistor has an intrinsic dimension of ~100 nm across and several hundred nm long that is difficult to achieve by standard lithographic nanofabrication techniques.

Figure 6:
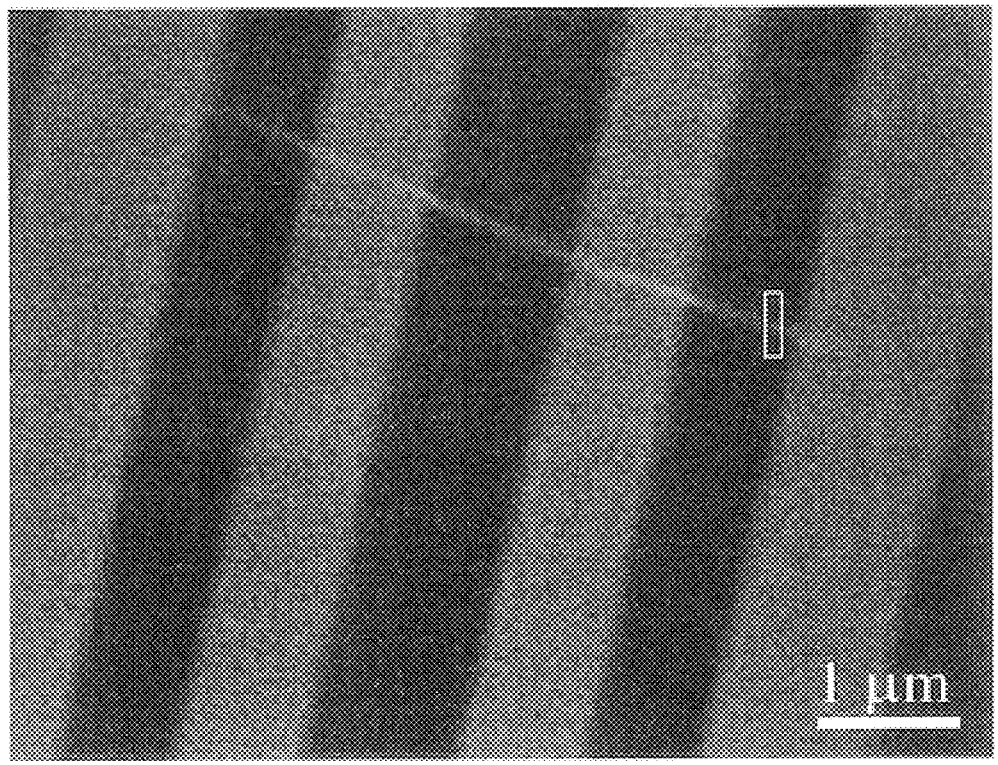
FIG. 6 is an SEM image of Y-junction nanotubes on gold electrodes used to perform two probe (I-V) measurements.
Figure 7:
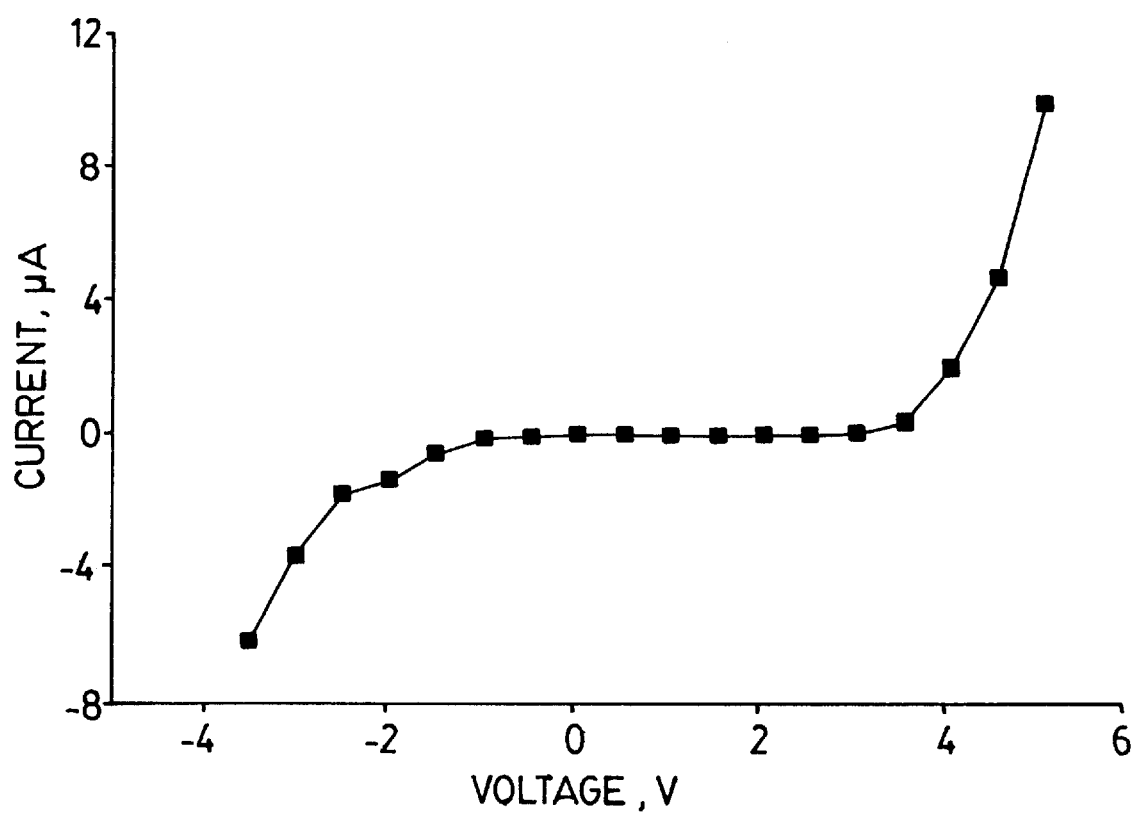
FIG. 7 shows the I-V plot for molecular scale rectifier produced using a Y-junction carbon nanotube.

The room temperature current-voltage (I-V) characteristics of individual Y-junction carbon nanotube diodes fabricated using the present invention are reported herein. The (I-V) measurements were performed using lithographically patterned gold electrodes as shown in FIG. 6. Two probe transport measurements were performed after making (and verifying) reliable low resistance contacts to the two ends of the Y-junction tubes in the configuration shown in FIG. 5a. FIG. 7 shows experimental (I-V) data obtained at room temperature. The Y-junctions display strong rectifying behavior which agrees with the asymmetry in bandgap caused by the smaller diameter branched tubes, and is consistent with that of a scattering matrix transport model (not shown). In particular, electron flow into the branches has a higher transmission than that out of the branches which accounts for the higher threshold for positive voltage.

The present invention represents the first realization of a carbon nanotube heterojunction device. In the case of the molecular scale-rectifier, the diode operation depends only on the global diameter change of the tubes across the Y-junction and not on the details of the lattice structure.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A method of producing branched carbon nanotubes, comprising:

producing a template by anodizing a sheet of aluminum in an acid solution at a first anodization voltage $V_1$ for a first effective period of time to produce an array of pores at a surface of the aluminum, said first anodization voltage producing said pores with a first diameter;

reducing said first anodization voltage by a preselected amount to a second anodization voltage $V_2$ and anodizing for a second effective period of time so that at least some of said pores branch into at least two pores each having a second diameter less than said first diameter; and exposing said anodized aluminum template to an effective hydrocarbon gas at an effective temperature, pressure and flow rate to grow carbon nanotubes in said branched pores.

2. The method according to claim 1 including etching an anodic film produced by anodizing the sheet of aluminum at said first anodization voltage and after the anodic film has been removed, anodizing said sheet of aluminum at $V_1$ for a third effective period of time prior to reducing the anodization voltage to grow the branched pores in a hexagonal array.

3. The method according to claim 2 wherein $V_1$ is in a range of from about 5 V to about 300 V.

4. The method according to claim 2 wherein $V_1$ is in a range of from about 40 V to about 100 V.

5. The method according to claim 4 wherein $V_2$ is approximately equal to $V_1/2^{0.5}$.

6. The method according to claim 5 including electrochemically depositing an effective catalyst into said pores of said template prior to exposure of said template to said hydrocarbon gas, wherein said catalyst is selected from the group consisting of cobalt, nickel, cobalt/nickel alloys, iron, cobalt/iron alloys, copper, iron/copper alloys, platinum, molybdenum and iron-molybdenum.

7. The method according to claim 1 including depositing an effective catalyst into said pores of said template prior to exposure of said template to said hydrocarbon gas.

8. A method of producing an alumina template having branched pores, comprising:

producing a template by anodizing a sheet of aluminum in an acid solution at a first anodization voltage $V_1$ for a first effective period of time to produce an array of pores at a surface of the aluminum, said first anodization voltage producing said pores with a first diameter;

etching an anodic film produced by anodizing the sheet of aluminum at said first anodization voltage $V_1$ and, after the anodic film has been removed, anodizing the sheet of aluminum at $V_1$ for a second effective period of time to produce another array of pores at the surface of the aluminum; and thereafter reducing said first anodization voltage by a preselected amount to a second anodization voltage $V_2$ and anodizing for a third effective period of time so that at least some of said pores branch into a hexagonal array.

9. The method according to claim 8 wherein $V_1$ is in a range of from about 40 V to about 100 V, and wherein $V_2$ is approximately equal to $V_1/2^{0.5}$.

10. A method of producing branched carbon nanotubes, comprising:

producing a template by anodizing a sheet of aluminum in an acid solution at a first anodization voltage $V_1$ for a first effective period of time to produce a hexagonal array of pores at a surface of the aluminum, said first anodization voltage producing said pores with a first diameter;

etching an anodic film produced by anodizing the sheet of aluminum at said first anodization voltage and after the anodic film has been removed, anodizing said sheet of aluminum at $V_1$ for a second effective period of time;

reducing said first anodization voltage by a preselected amount to a second anodization voltage $V_2$ and anodizing for a third effective period of time so that at least some of said pores branch into two pores each having a second diameter less than said first diameter;

depositing an effective catalyst into said pores of said template; and exposing said anodized aluminum template with the catalyst containing pores to an effective hydrocarbon gas at an effective temperature, pressure and flow rate to grow carbon nanotubes in said branched pores.

11. The method according to claim 10 wherein $V_2$ is approximately equal to $V_1/2^{0.5}$.

12. The method according to claim 11 wherein $V_1$ is in a range of from about 40 V to about 100 V.

13. The method according to claim 12 wherein $V_1$ is about 50 V and the first effective period of time is about 15 hours, and $V_2$ is about 35 V and the third effective period of time is about 40 minutes.

14. The method according to claim 13 wherein the second effective period of time is about 30 minutes.

15. The method according to claim 13 wherein the acid solution is an oxalic acid solution.

16. The method according to claim 13 wherein said effective catalyst is electrochemically deposited in said pores, and wherein said catalyst is selected from the group consisting of cobalt, nickel, cobalt/nickel alloys, iron, cobalt/iron alloys, copper, iron/copper alloys, platinum, molybdenum and iron-molybdenum.

17. The method according to claim 16 wherein said catalyst is cobalt and said hydrocarbon gas is acetylene.

18. The method according to claim 16 including reducing said cobalt metal after deposition into said pores.

19. The method according to claim 17 including dissolving said template and collecting said Y-junction nanotubes.

20. The method according to claim 19 including annealing the Y-junction carbon nanotubes after the growth of the nanotubes.

21. The method according to claim 12 wherein the acid solution is formed from an acid selected from the group consisting of oxalic acid, phosphoric acid, sulfuric acid and chromic acid.

22. The method according to claim 11 wherein said effective catalyst is cobalt metal electrochemically deposited in said pores.

23. The method according to claim 10 including dissolving said template and collecting said Y-junction nanotubes.

24. The method according to claim 23 including annealing the Y-junction carbon nanotubes after the growth of the nanotubes.

25. A method of producing an alumina template having branched pores, comprising:

producing a template by anodizing a sheet of aluminum in an acid solution at a first anodization voltage $V_1$ for a first effective period of time to produce a hexagonal array of pores at a surface of the sheet of aluminum, said first anodization voltage producing pores with a first diameter;

etching an anodic film produced by anodizing the sheet of aluminum at said first anodization voltage and after the anodic film has been removed, anodizing said sheet of aluminum at $V_1$ for a second effective period of time; and reducing said first anodization voltage by a preselected amount to a second anodization voltage $V_2$ and anodizing for a third effective period of time so that at least some of said pores branch into two pores each having a second diameter less than said first diameter.

26. The method according to claim 25 wherein $V_2$ is approximately equal to $V_1/2^{0.5}$.

27. The method according to claim 26 wherein $V_1$ is in a range of from about 40 V to about 100 V.

28. The method according to claim 27 wherein $V_1$ is about 50 V and the first effective period of time is about 15 hours, and $V_2$ is about 35 V and the third effective period of time is about 40 minutes.

29. The method according to claim 28 wherein the second effective period of time is about 30 minutes.

30. The method according to claim 28 wherein the acid solution is an oxalic acid solution.

31. The method according to claim 27 wherein the acid solution is formed from an acid selected from the group consisting of oxalic acid, phosphoric acid and sulfuric acid.

* * * * *